US012571463B2

(12) United States Patent (10) Patent No.: US 12,571,463 B2
Brezger et al. (45) Date of Patent: Mar. 10, 2026

(54) DIFFERENTIAL GEAR AND DRIVE TRAIN WITH SUCH A DIFFERENTIAL GEAR

(71) Applicant: BorgWarner Inc., Auburn Hills, MI (US)

(72) Inventors: Friedrich Philipp Brezger, Karlsruhe (DE); Oliver Groneberg, St. Leon-Rot (DE); Tobias Kaufhold, Sandhausen (DE); Florian Schneider, Hockenheim (DE); Yun Kai Lim, Mannheim (DE)

(73) Assignee: BORGWARNER INC., Auburn Hills, MI (US)

( * ) Notice: Subject to any disclaimer, the term of this patent is extended or adjusted under 35 U.S.C. 154(b) by 449 days.

(21) Appl. No.: 18/298,843

(22) Filed: Apr. 11, 2023

(65) Prior Publication Data

US 2023/0332678 A1    Oct. 19, 2023

(30) Foreign Application Priority Data

Apr. 14, 2022    (DE) .......................... 102022001304.5

(51) Int. Cl.
F16H 48/30 (2012.01)
B60K 17/354 (2006.01)
(Continued)

(52) U.S. Cl.
CPC ........... F16H 48/30 (2013.01); B60K 17/354 (2013.01); B60K 17/356 (2013.01); F16H 48/08 (2013.01); F16H 2048/202 (2013.01)

(58) Field of Classification Search
CPC .... F16H 48/08; F16H 48/30; F16H 2048/202; B60K 17/354; B60K 17/356
See application file for complete search history.

(56) References Cited

U.S. PATENT DOCUMENTS 6,299,562 B1 * 10/2001 Kim ...................... B60K 23/08
                                                                   475/221
2018/0154772 A1    6/2018 Blair et al.
(Continued)

FOREIGN PATENT DOCUMENTS

DE    112016001904 T5    1/2018
DE    102018129934 B3    11/2019
(Continued)

OTHER PUBLICATIONS

English language abstract for DE 11 2016 001 904 T5 extracted from espacenet.com database on Jun. 9, 2023, 2 pages.
(Continued)

*Primary Examiner* — William C Joyce
(74) *Attorney, Agent, or Firm* — Howard & Howard Attorneys PLLC

(57)    ABSTRACT

A differential gear with an input side that can be rotated about an axis of rotation, which has a rotary drive contour for the rotary drive engagement with a drive wheel and at least one pinion gear that can be rotated about a pinion axle, and an output side that can be rotated about the axis of rotation, which has a first axle wheel and a second axle wheel which are in rotary drive engagement with the at least one pinion gear, wherein the input side has a rotary drive section on which the rotary drive contour is provided, and a support section on which the at least one pinion gear is arranged. The rotary drive section and the support section can optionally be brought into a rotary drive connection with one another by means of a shiftable pawl freewheel.

20 Claims, 5 Drawing Sheets

Figure 1:
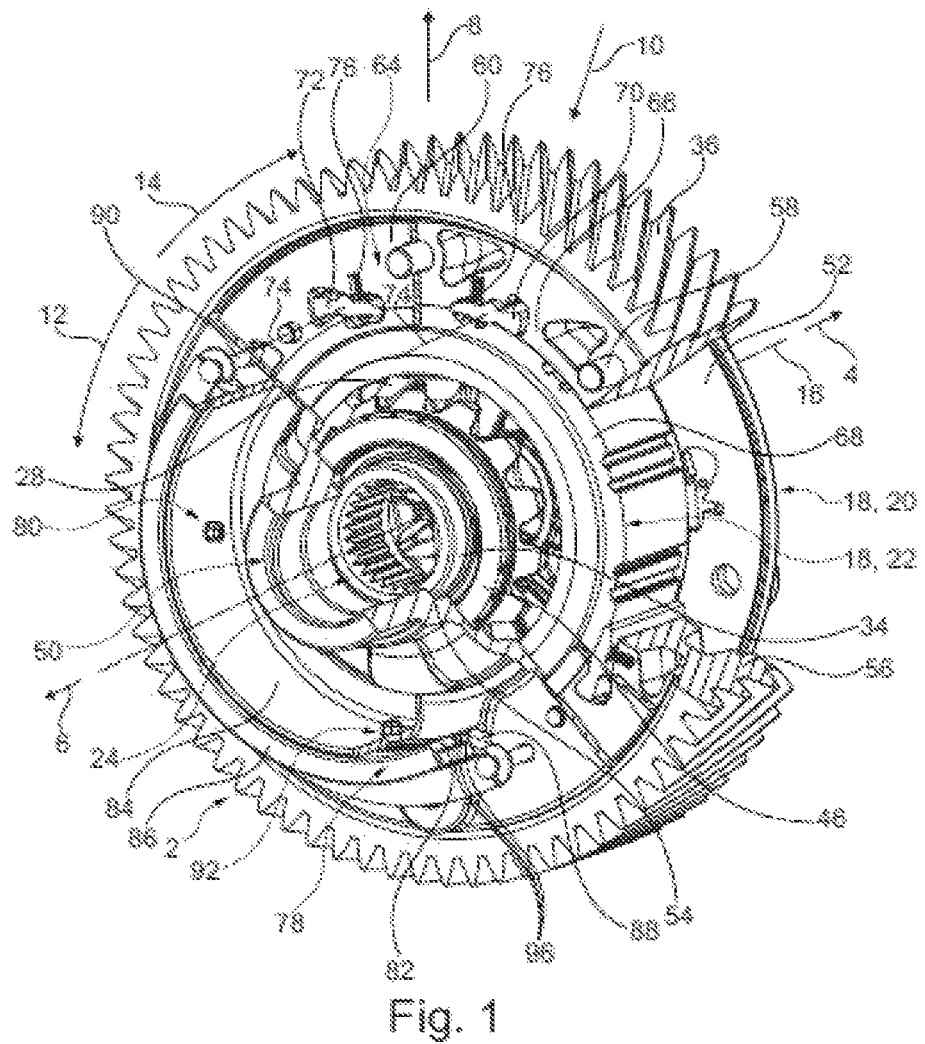

(51) Int. Cl.
    *B60K 17/356*       (2006.01)
    *F16H 48/08*        (2006.01)
    *F16H 48/20*        (2012.01)

(56)           References Cited

U.S. PATENT DOCUMENTS

| | | |
|---|---|---|
| 2019/0063513 A1 | 2/2019 | Peglowski et al. |
| 2021/0324923 A1 | 10/2021 | Jörgensson et al. |

FOREIGN PATENT DOCUMENTS

| | | | |
|---|---|---|---|
| DE | 102018217863 A1 | 4/2020 | |
| JP | 61-24232 * | 2/1986 | |
| WO | WO-2017151693 A1 * | 9/2017 | ............ F16D 41/16 |

OTHER PUBLICATIONS

Machine-assisted English language abstract and machine-assisted English language translation for DE 10 2018 129 934 B3 extracted from espacenet.com database on Jun. 9, 2023, 18 pages.
Machine-assisted English language abstract and machine-assisted English language translation for DE 10 2018 217 863 A1 extracted from espacenet.com database on Jun. 9, 2023, 22 pages.

* cited by examiner

DIFFERENTIAL GEAR AND DRIVE TRAIN WITH SUCH A DIFFERENTIAL GEAR

CROSS-REFERENCE TO RELATED APPLICATIONS

This application claims priority pursuant to 35 U.S.C. 119 to German Application No. 102022001304.5, filed Apr. 14, 2022, which application is incorporated herein by reference in its entirety.

FIELD

The present invention relates to a differential gear with an input side that can be rotated about an axis of rotation, which has a rotary drive contour for the rotary drive engagement with a drive wheel and at least one pinion gear that can be rotated about a pinion axle, and an output side that can be rotated about the axis of rotation, which has a first axle wheel and a second axle wheel which are in rotary drive engagement with the at least one pinion gear, wherein the input side has a rotary drive section on which the rotary drive contour is provided, and a support section on which the at least one pinion gear is arranged. In addition, the present invention relates to a drive train for a motor vehicle with such a differential gear.

BACKGROUND

Motor vehicles with wheel axles are known from practice, which are divided into two lateral axle shafts via a differential gear in order to be able to compensate for the different speeds of the wheels of the same wheel axle when cornering or the like. Thus, the known differential gears have an input side that can be rotated about an axis of rotation, which has a rotary drive contour for the rotary drive engagement with a drive wheel and at least one differential pinion that can be rotated about a pinion axle. Consequently, the drive wheel of a drive unit drives the input side of the differential gear, which is then rotated about the axis of rotation, while the differential pinion is also rotated about the axis of rotation and can also be rotated about its pinion axle in order to bring about the above-mentioned compensation at different speeds of the wheels. In addition, the differential gear has an output side that can be rotated about said axis of rotation. The output side is substantially formed by a first axle wheel and a second axle wheel, which are in rotary drive engagement with the at least one differential pinion, wherein the first axle wheel is non-rotatably connected to a first axle shaft and the second axle wheel is non-rotatably connected to a second axle shaft of the wheel axle. The rotary drive contour, which is designed for the rotary drive engagement with the drive wheel, is provided on a rotary drive section of the input side, while the at least one differential pinion is arranged on a support section of the input side. In this case, the rotary drive section and the support section are permanently connected to one another in a non-rotatable manner. In order to be able to drive the two axle shafts following the differential gear optionally by an electric drive unit, for example, a shiftable coupling device can be arranged in the torque transmission path in front of the drive wheel, for example, in order to bring the drive unit optionally to the differential gear and thus to the axle shafts in a rotary drive connection or not. Depending on the design, however, this can lead to a very complex design.

It is therefore an object of the present invention to further develop a differential gear of the generic type in such a way that it has a relatively compact design and enables a particularly simple, optional driving of the two axle shafts via the differential gear. In addition, the underlying object of the present invention is to create a drive train with such an advantageous differential gear.

This object is achieved by the features specified in patent claims 1 and 10, respectively. Advantageous embodiments of the invention are the subject matter of the dependent claims.

SUMMARY

The differential gear according to the invention has an input side which can be rotated about an axis of rotation of the differential gear. The input side of the differential gear also has a rotary drive contour which is designed for rotary drive engagement with a drive wheel. The rotary drive contour is preferably a toothing, for example a helical toothing, wherein the toothing can be designed in the form of external toothing or internal toothing. The drive wheel can be a wheel with a rotary drive contour adapted to the rotary drive contour of the input side, wherein the drive wheel can be driven, for example, by an internal combustion engine or an electric drive unit, preferably an electric machine, in order to rotate the input side of the differential gear about the axis of rotation via the drive wheel. It is preferred here if the axis of rotation of the input side extends transversely to the axis of rotation of the drive wheel. In addition, the input side has at least one differential pinion, which can be rotated about a pinion axle relative to the other components of the input side. The pinion axle preferably extends transversely to the axis of rotation of the input side. In addition, it is preferred if at least two differential pinions are provided, wherein two differential pinions are particularly preferably arranged on the same pinion axle, possibly on the same shaft. In addition, the at least one differential pinion is preferably designed as a differential bevel gear. Furthermore, the differential gear has an output side which, like the input side, can be rotated about said axis of rotation. The output side has a first axle wheel and a second axle wheel, which are in rotary drive engagement with the at least one differential pinion. The first and second axle wheels are preferably axle bevel gears. Furthermore, the axle wheels preferably each have a rotary drive contour which can be brought into rotary drive engagement with the rotary drive contour of an axle shaft. The input side of the differential gear is substantially divided into two sections, namely a rotary drive section, on which the rotary drive contour for the rotary drive engagement with the drive wheel is provided, and a support section on which the at least one differential pinion is arranged such that it can rotate about the pinion axle. Irrespective of whether the rotary drive section or the support section is designed in one piece or in multiple parts, it is preferred that a rotary drive section or a support section is understood to mean all those components on the input side that are permanently connected to one another in a non-rotatable manner. In order on the one hand to enable simple optional driving of the output side via the input side of the differential gear and on the other hand to achieve a particularly compact design of the differential gear, the rotary drive section and the support section can be optionally brought into a rotary drive connection with one another by means of a shiftable pawl freewheel. Thanks to the use of a shiftable pawl freewheel between the rotary drive section and the support section of the differential gear, the shiftability is advantageously integrated into the differential gear, wherein, compared to a friction coupling, the additional advantage is that no drag torques occur and a higher torque density can be achieved. In addition, significantly faster and more comfortable shifting is possible than with a so-called claw coupling.

In one advantageous embodiment of the differential gear according to the invention, the shiftable pawl freewheel has an outer race, an inner race and pawls arranged pivotably in the radial direction between the inner and outer races. In this embodiment, it is preferred if the pawls can be or are supported in the radial direction on the inner and outer races. Furthermore, it has proven to be advantageous if the pawls can each be pivoted about a pivot axis extending in the axial direction of the differential gear, wherein the pivot axes of the pawls are therefore pivot axes which run parallel to the axis of rotation of the input side of the differential gear. In principle, pawls could also be used, which are arranged in the axial direction between two races and can be or are supported on them, but the embodiment according to the invention described has proven particularly effective with regard to a simplified and reliable shiftability. Furthermore, the present embodiment can achieve a particularly advantageous torque transmission between the rotary drive section and the support section, while a particularly compact design can also be implemented in the axial direction.

In order to achieve on the one hand a particularly compact design and on the other hand the most direct possible transmission of torque between the input side and the output side of the differential gear, the pawl freewheel and/or the rotary drive contour in a preferred embodiment of the differential gear according to the invention is arranged nested in the radial direction with the at least one differential pinion. In the case of the pawl freewheel arranged radially nested, it is particularly preferred if at least one pawl, preferably a plurality or all pawls, of the pawl freewheel is/are arranged nested in the radial direction with the at least one differential pinion. In addition, it is particularly preferred in this embodiment if the pawl freewheel and/or the rotary drive contour is arranged nested in the radial direction with the one differential gear such that the pawl freewheel and/or the rotary drive contour is arranged aligned with the pinion axle of the differential pinion. In the ideal case, the pinion axle could, for example, form a central axle with respect to the axial extent of the pawl freewheel and/or the rotary drive contour.

In a further advantageous embodiment of the differential gear according to the invention, the input side of the differential gear forms a gear housing in which the first axle wheel and second axle wheel are arranged and/or on which the first axle wheel and second axle wheel can be or are supported in the axial and/or radial direction. It is preferred here if the first axle wheel and the second axle wheel can be or are supported in the axial and/or radial direction by means of a plain bearing. The gear housing can also be referred to as the so-called differential basket of the differential gear, wherein it is preferred if the at least one differential pinion is also arranged inside the gear housing. In this embodiment, the gear housing can be formed, for example, by the rotary drive section or the support section of the input side of the differential gear, as will be explained in more detail later.

In a further advantageous embodiment of the differential gear according to the invention, the gear housing has two shaft openings for axle shafts, which are assigned to the first axle wheel and the second axle wheel. A first axle shaft can be fed to the first axle wheel via a first shaft opening in order to connect them to one another in a non-rotatable manner, while a second axle shaft can have been fed to the second axle wheel via a second shaft opening in order to achieve a corresponding non-rotatable connection between the second axle wheel and the second axle shaft. At least one of the shaft openings is formed in a tubular axial section of the gear housing, wherein this applies preferably to both shaft openings. It is also preferred in this embodiment if the tubular axial section has a smaller radial extent than an axial section of the gear housing that accommodates the at least one differential pinion. Overall, a gear housing is preferred which is designed to be substantially symmetrical or mirror-symmetrical with respect to the aforementioned pinion axle when the differential gear is viewed from the side.

In a particularly preferred embodiment of the differential gear according to the invention, the rotary drive section of the differential gear forms the gear housing. The support section of the input side of the differential gear is accommodated in the gear housing formed by the rotary drive section, wherein the support section is designed annular and can be or is supported in the radial direction and/or in the axial direction on the gear housing. The supportability of the annular support section in the radial direction can in principle be achieved by means of any embodiment of a bearing or radial bearing, but it is preferred if the support in the radial direction takes place by means of a plain bearing or via the pawl freewheel. In the latter case, the sliding support thus takes place via the sides of the outer and inner race that face one another, which are present anyway, so that no additional plain bearing would have to be provided for radial support, although this can also be advantageous under certain circumstances. The support or supportability of the annular support section in the axial direction can equally take place via plain bearings. In addition, it has sometimes proven to be advantageous when supporting the annular support section in the axial direction if this has play, so that the annular support section together with the at least one differential pinion can be displaced to a certain extent in the axial direction relative to the gear housing.

In a particularly advantageous embodiment of the differential gear according to the invention, the inner race of the pawl freewheel is designed in one piece with the annular support section in order to ensure a particularly compact design on the one hand and the most direct and reliable possible torque transmission on the other hand.

In a further particularly preferred embodiment of the differential gear according to the invention, the outer race of the pawl freewheel is designed in one piece with the rotary drive contour and/or the gear housing formed by the rotary drive section in order to achieve a compact design and a direct and reliable torque transmission. An outer race of the pawl freewheel configured in one piece with the gear housing is preferably to be understood as meaning an outer race that actually at least partially has the function of a section of a gear housing, namely the delimitation of the interior of the gear housing, and is not only arranged from the outside on an already completely closed wall section of the gear housing.

As an alternative to the embodiment variants described above, in which the rotary drive section forms the gear housing, in a further preferred embodiment of the differential gear according to the invention the support section of the input side of the differential gear forms the gear housing in which—as already described above—the first and second axle wheel are arranged and/or on which the first and second axle wheel can be or are supported. In this embodiment, it is preferable if the inner race of the shiftable pawl freewheel is designed in one piece with the gear housing in order to achieve a particularly compact design.

In a further particularly advantageous embodiment of the differential gear according to the invention, in which the support section of the input side of the differential gear forms the gear housing, the outer race of the shiftable pawl freewheel is designed in one piece with the rotary drive contour for the rotary drive engagement with the drive wheel. Alternatively, the outer race is formed separately from an input wheel which has the rotary drive contour and which is fixed in a non-rotatable manner to the outer race, for example welded or pressed to the outer race. In this embodiment, the outer race and the input wheel can first be manufactured separately from one another before they can be connected to one another in a non-rotatable manner.

In the case of an outer race, which is formed in one piece with the rotary drive contour, or an input wheel, which is formed separately from the outer race and has the rotary drive contour, the outer race or the input wheel in a further advantageous embodiment of the differential gear according to the invention is in the radial direction and/or can be or is supported on the gear housing in the axial direction. The support in the radial direction is preferably provided by means of a roller bearing, possibly a needle bearing. Moreover, it is preferred if the support in the radial direction and/or in the axial direction takes place via a radial section which has been attached to the outer race or which forms a section of the one-piece input wheel. In addition, it has proven to be advantageous if the support in the radial direction and/or the axial direction, the latter in at least one of the axial directions, takes place on the tubular axial section of the gear housing, in which the above-mentioned shaft opening is formed and which preferably has a smaller radial extent than the axial section of the gear housing that accommodates the differential pinion.

In a further advantageous embodiment of the differential gear according to the invention, the rotary drive contour of the input side of the differential gear is designed as an outer rotary drive contour in the radial direction, thus for example as an external toothing.

Deviating from the embodiment described above, the rotary drive contour of the input side is designed in a further preferred embodiment of the differential gear according to the invention as an inner rotary drive contour in the radial direction, thus for example as an internal toothing. The inner rotary drive contour is preferably in rotary drive engagement with a tubular drive wheel arranged coaxially to the axis of rotation. The tubular drive wheel is particularly preferably rotatably mounted on the gear housing, possibly the aforementioned tubular axial section of the gear housing. The mounting can take place, for example, via a roller bearing or plain bearing.

According to a further advantageous embodiment of the differential gear according to the invention, an activating element that can be displaced in the axial direction, i.e. in the direction of the axis of rotation of the differential gear, is provided for shifting the pawl freewheel. The activating element is preferably arranged on the input side such that it can be displaced in the axial direction directly or via a support element attached to the input side. If the actuation element is arranged directly on the input side, an additional support element can be dispensed with, which further simplifies the design of the differential gear. In contrast, in the case of an actuation element which is arranged on the input side via a support element fixed to the input side, the input side does not have to have an adapted shape or structure. Rather, this can be achieved by a correspondingly configured support element which is fixed to the input side and which can be, for example, a simple sheet metal part or a tubular and/or coaxially arranged sheet metal part.

In a further preferred embodiment of the differential gear according to the present invention, the activating element for shifting the pawl freewheel has a tubular support section, which is slidably supportable or supported on a peripheral outer side of the input side or a tubular support element section of the aforementioned support element.

In order to be able to transfer the shiftable pawl freewheel in a targeted manner and into certain shifting positions and to be able to hold it in these shifting positions, in a further advantageous embodiment of the differential gear according to the invention, the activating element is assigned a latching device for latching the activating element in at least one axial position, preferably in at least two or at least three axial positions, relative to the pawl freewheel.

In a further advantageous embodiment of the differential gear according to the invention, the aforementioned latching device is arranged between the tubular support section of the activating element and the peripheral outer side of the input side.

According to a further advantageous embodiment of the differential gear according to the invention, the latching device for latching the activating elements is arranged between the tubular support section of the activating element and the tubular support element section.

In a further particularly preferred embodiment of the differential gear according to the invention, the latching device is arranged between the activating element and a second tubular support element section of the support element which is arranged opposite the tubular support element section in the radial direction. This embodiment is advantageous in that the activating element can be securely supported on the tubular support element section in the radial direction and guided in the axial direction, while latching can take place via a second tubular support element section of the support element. In this embodiment, it is also preferred if the support element has a U-shaped cross-section, the limbs of which are formed by the two tubular support element sections, while these are connected to one another on one side via a connecting limb.

In a further advantageous embodiment of the differential gear according to the invention, in which the activating element is assigned a latching device for latching the activating element, the latching device has at least one spring pretensioned latching element, for example a ball, which can be latched in two or more latching depressions on the one hand, and on the other hand latching grooves, for example. The spring pretensioning can be applied via a corresponding spring element. Regardless of the embodiment of the spring element, it is preferred if the latching element is pretensioned in the radial direction.

In a further advantageous embodiment of the differential gear according to the invention, the activating element interacts with the pawls of the pawl freewheel. In this case, the activating element and the pawl preferably interact directly with one another. The interaction also takes place particularly preferably via axially protruding activating pins on the activating element. Thus, each of the pawls is preferably assigned an activating pin on the activating element.

In a further particularly advantageous embodiment of the differential gear according to the invention, the activating element can be moved or displaced between at least three axial positions, i.e. between a first axial position, a second axial position and a third axial position. In the first axial position, the rotary drive section is rotationally drivingly coupled to the support section in a first and second relative direction of rotation via the pawls. In this case, it is preferred if the pawls are pretensioned in their pivoted position, in which they bring about the rotary drive coupling. In the second axial position, the rotary drive section is rotationally drivingly coupled to the support section in the first relative direction of rotation but not in the second relative direction of rotation via at least one pawl. In the third axial position, however, the rotary drive section is rotationally drivingly coupled to the support section via the pawls neither in the first nor in the second relative direction of rotation.

The drive train according to the invention for a motor vehicle has a first wheel axle, which can be driven by a first drive unit, possibly an electric drive unit, preferably an electric machine and/or an internal combustion engine, and a second wheel axle. The drive train is preferably a drive train for a hybrid vehicle. The second wheel axle of the drive train can optionally be driven via a differential gear of the type according to the invention by a second drive unit, possibly an electric drive unit, preferably an electric machine. Consequently, with the help of the differential gear according to the invention, a drive train can be created which enables the optional operation of the drive train as an all-wheel drive in a particularly simple manner.

In a preferred embodiment of the drive train according to the invention, the input side of the differential gear, preferably the rotary drive contour of the rotary drive section, is in rotary drive connection with the second drive unit, preferably a drive wheel of the second drive unit.

In a particularly preferred embodiment of the drive train according to the invention, the output side of the differential gear, preferably the first axle wheel and the second axle wheel, is in rotary drive connection with the second wheel axle, preferably a first axle shaft and a second axle shaft of the second wheel axle.

BRIEF DESCRIPTION

The invention is explained in more detail below using exemplary embodiments with reference to the attached drawings. In the following:

FIG. 1 shows a perspective and partially cross-sectional representation of a first embodiment of a differential gear.

Figure 2:
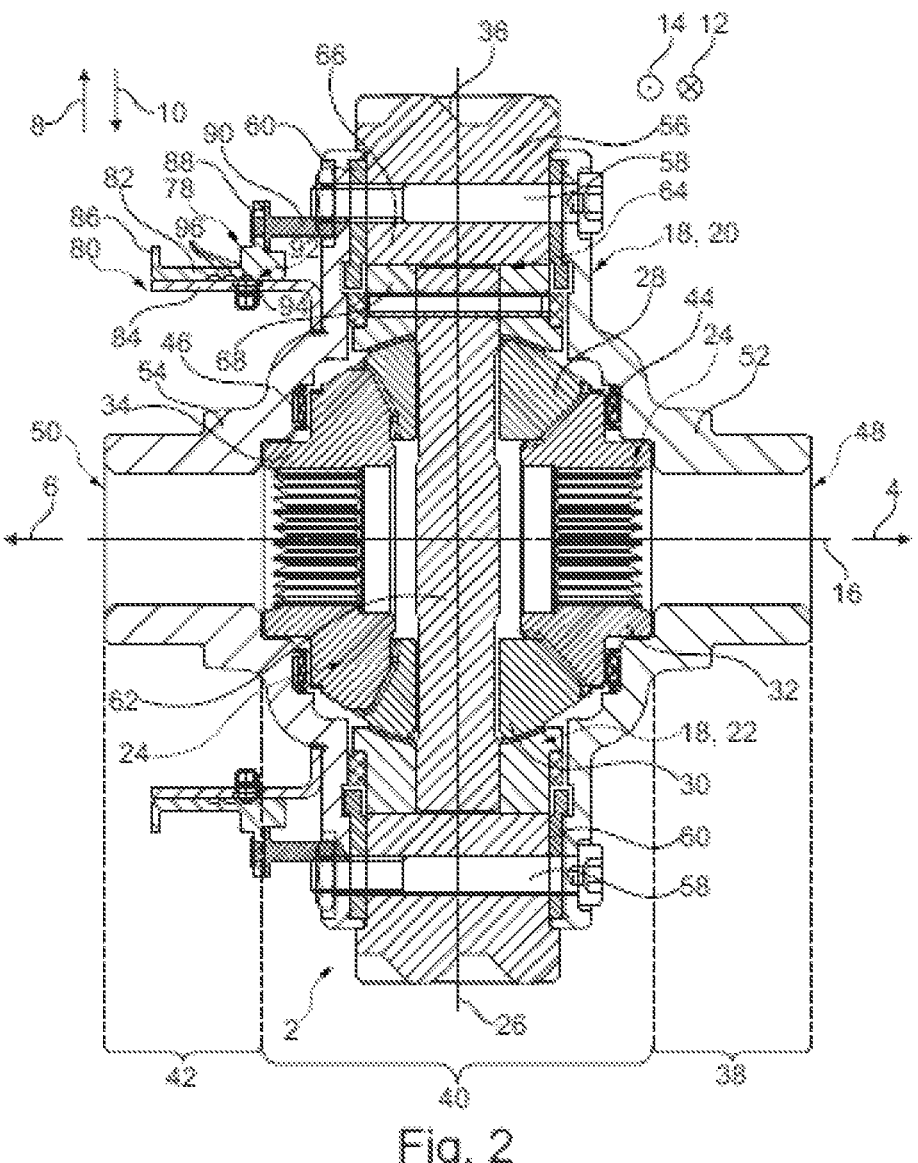
Figure 3:
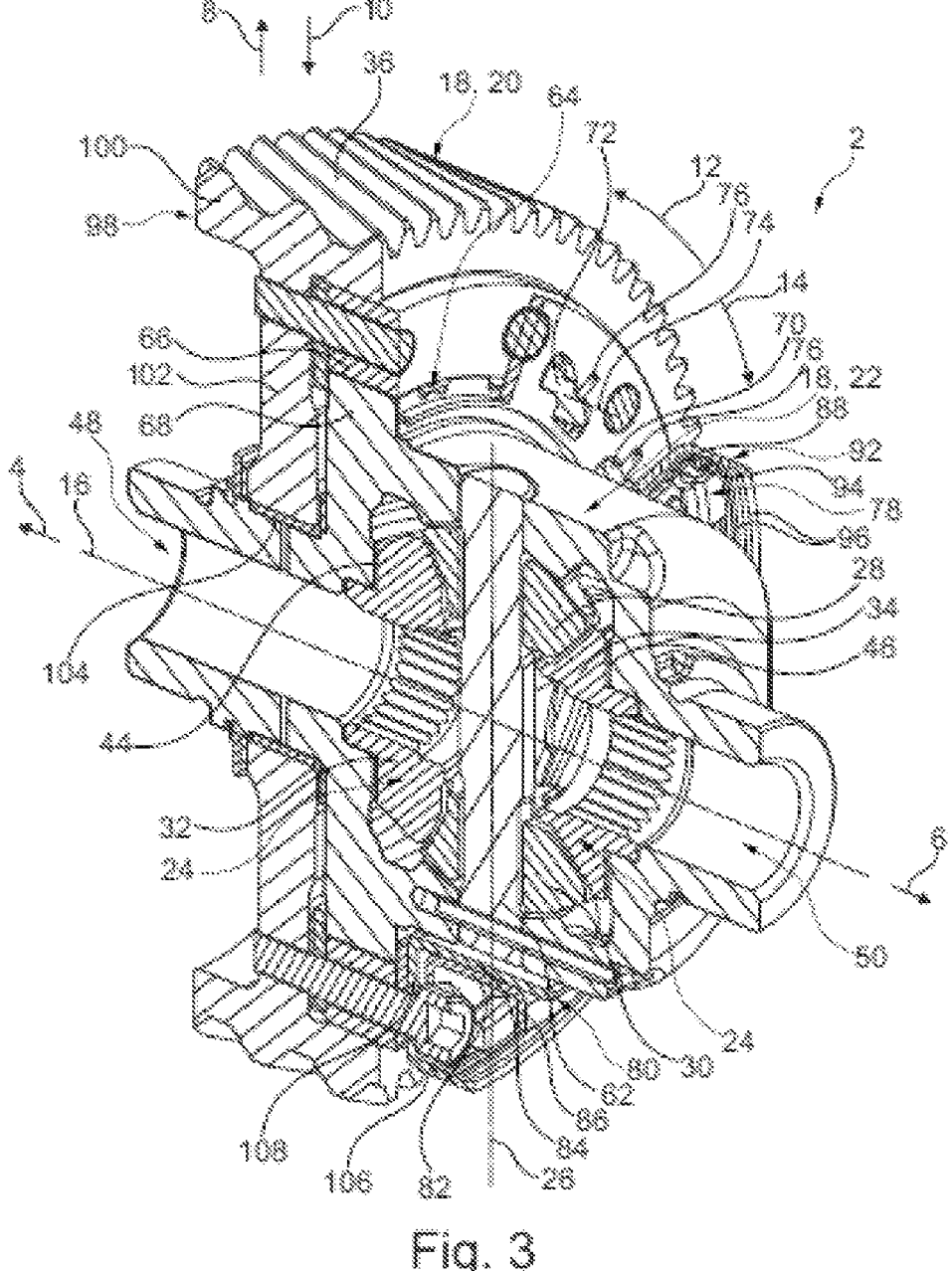
Figures 4, 5:
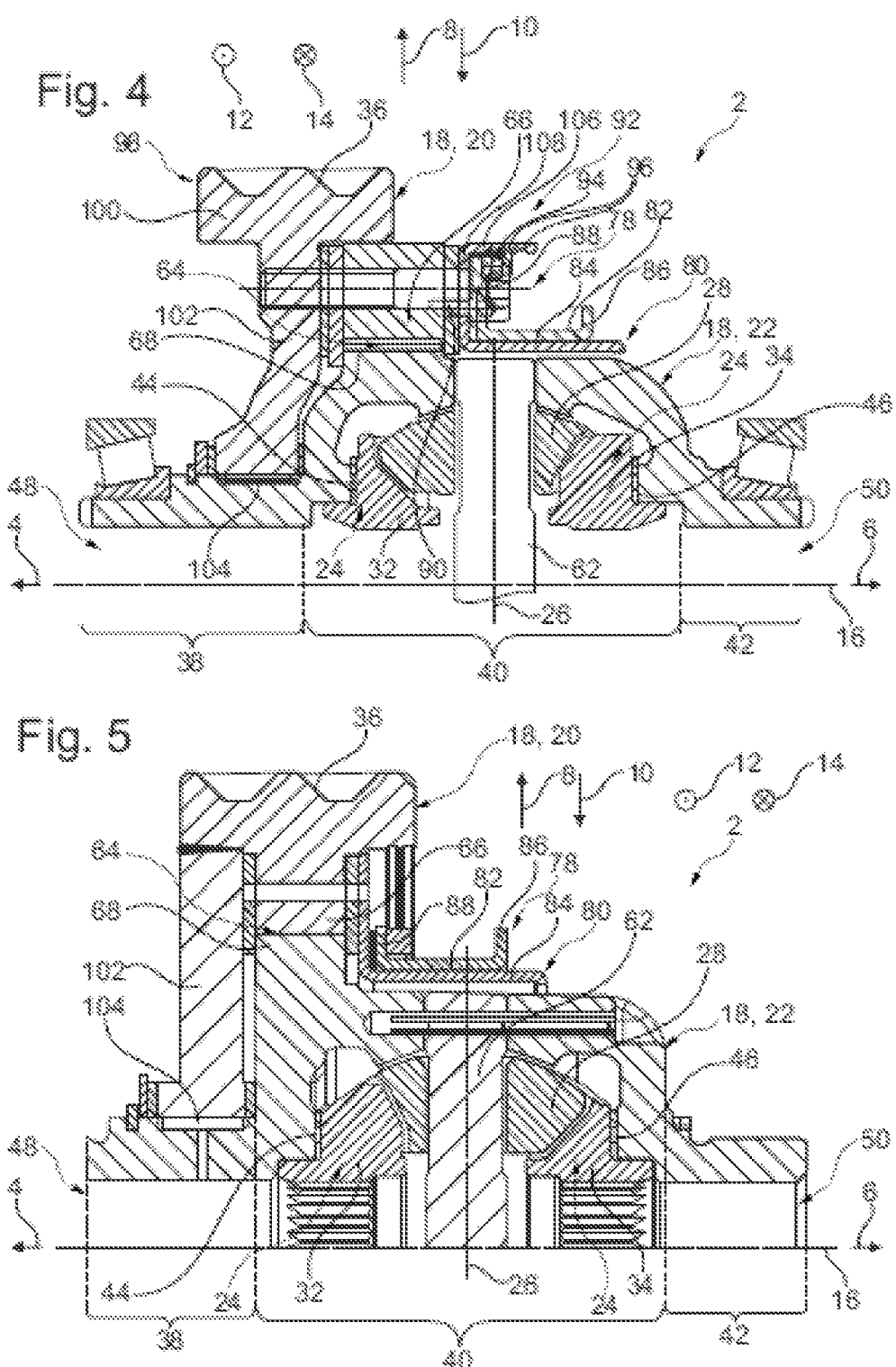
Figures 6, 7:
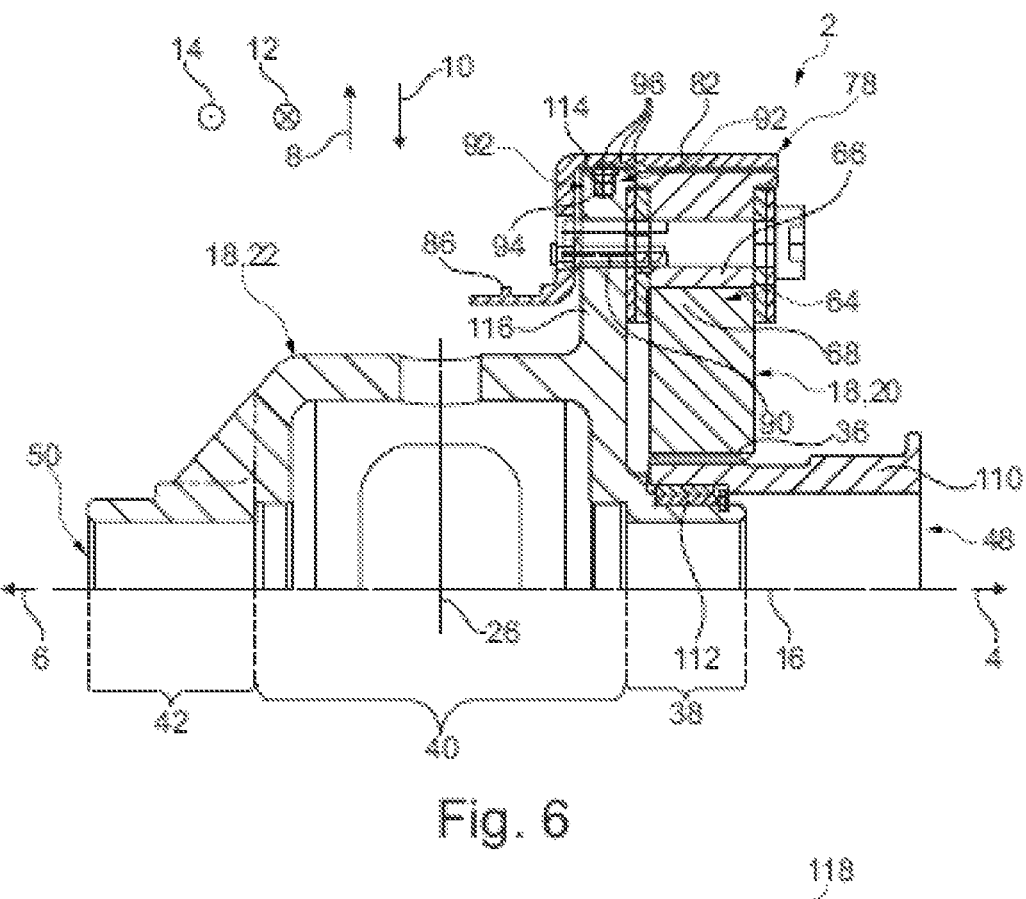

FIG. 2 shows a side view of the differential gear from FIG. 1 in a cross-sectional representation, FIG. 3 shows a perspective and partially cross-sectional representation of a second embodiment of a differential gear, FIG. 4 shows a side view of the differential gear from FIG. 3 in a cross-sectional representation, FIG. 5 shows a side view of a third embodiment of a differential gear in a cross-sectional representation, FIG. 6 shows a side view of a fourth embodiment of a differential gear in a cross-sectional representation, and FIG. 7 shows a schematic representation of a drive train with a differential gear, in particular a differential gear according to one of FIGS. 1 to 6.

DETAILED DESCRIPTION

In the Figures, the mutually opposite directions of the differential gear 2 are indicated by means of corresponding arrows, namely the axial directions 4, 6, the radial directions 8, 10 and the circumferential directions 12, 14, wherein the differential gear 2 has an axis of rotation 16 extending in the axial directions 4, 6.

FIGS. 1 and 2 show a first embodiment of the differential gear 2. The differential gear 2 has an input side 18 that can be rotated about the axis of rotation 16. The input side 18, which can be rotated about the axis of rotation 16, is composed substantially of a rotary drive section 20 and a support section 22. Furthermore, the differential gear 2 has an output side 24 which can also be rotated about the axis of rotation 16. In addition, the input side 18 of the differential gear 2 has at least one differential pinion 28 that can rotate about a pinion axle 26, wherein two differential pinions 28, 30 are provided in the illustrated embodiment that can rotate about the same pinion axle 26. In addition, the pinion axle 26 extends transversely, here at right angles, to the axis of rotation 16 of the differential gear 2.

The two differential pinions 28, 30 are designed as differential bevel gears. The output side 24, on the other hand, has a first axle wheel 32 and a second axle wheel 34 located opposite in the axial direction 6, which—because they belong to the output side 24—can be rotated about the axis of rotation 16 and are in rotary drive engagement with both the differential pinion 28 and the differential pinion 30.

The input side 18 has a rotary drive contour 36 for the rotary drive engagement with a drive wheel of a drive unit, not shown in detail. The rotary drive contour 36 is provided on the rotary drive section 20 of the input side 18, wherein the rotary drive contour 36 is a rotary drive contour 36 pointing outwards in the radial direction 8, and therefore an outer rotary drive contour 36. In the illustrated embodiment, the rotary drive contour 36 is designed as a toothing, here an external toothing, wherein the external toothing shown is designed as a helical toothing, for example. The two differential pinions 28, 30, on the other hand, are arranged on the support section 22.

The input side 18 of the differential gear 2 likewise forms a gear housing, wherein the gear housing can also be referred to as a so-called differential basket. The gear housing substantially has three axial sections, namely a first axial section in the form of a tubular axial section 38, a second axial section in the form of an axial section 40 accommodating the differential pinions 28, 30 and the axle wheels 32, 34, and a third axial section in the form of a tubular axial section 42, which follow one another in the axial direction 6. As can be seen from the Figures, the two tubular axial sections 38, 42, which also form end sections of the housing, have a smaller extension in the radial direction 8, 10 than the central axial section 40. The first and second axle wheels 32, 34 are not only arranged in the gear housing formed by the input side 18, but can also be or are supported in the axial direction 4, 6 and the radial direction 8, 10, preferably by means of a plain bearing. Thus, the first axle wheel 32 is supported in the axial direction 4 via an axial bearing 44 and also in the radial direction 8, 10 on the gear housing. The second axle wheel 34, on the other hand, is supported on the gear housing via an axial bearing 46 in the axial direction 6 and also in the radial direction 8, 10.

As can be seen from FIG. 2, gear housing formed by the input side 18 has a first shaft opening 48 pointing in the axial direction 4 for a first axle shaft assigned to the first axle wheel 32 and a second shaft opening 50 pointing in the axial direction 6 for a second axle shaft assigned to the second axle wheel 34, wherein the first shaft opening 48 is formed in the tubular axial section 38, while the second shaft opening 50 is formed in the tubular axial section 42.

In the illustrated embodiment according to FIGS. 1 and 2, the rotary drive section 20 of the input side 18 forms the described gear housing, wherein the gear housing is composed of two housing halves 52, 54, here substantially identical in construction, which are fixed to one another with the interposition of an annular housing part 56, here by way of example with the aid of screw connections 58. In addition, the housing halves 52, 54 are supported on the annular housing part 56 in the axial direction 4, 6 via annular disks 60.

The previously mentioned support section 22 of the input side 18 is accommodated within the gear housing formed by the rotary drive section 20. The support section 22 is annular and has a shaft 62 which extends in the radial direction 8, 10 and on which the pinion gears 28, 30 are mounted so as to be rotatable about the pinion axle 26. In principle, each of the two pinion gears 28, 30 could also be assigned their own separate shafts. The annular support section 22 can be supported in the axial direction 4, 6 on the gear housing formed by the rotary drive section 20 of the input side 18, wherein the support section 22 is arranged with play in the axial direction 4, 6 within the gear housing. In the illustrated embodiment, the support section 22 can be or is supported in the axial direction 4 on a section of the annular disk 60 protruding in the radial direction 10 and in the axial direction 6 on a section of the opposite annular disk 60 protruding in the radial direction 10.

In order to bring the rotary drive section 20 and the support section 22 into a rotary drive connection with each other only if necessary for the purpose of transmitting a torque between the input side 18 and the output side 24, a shiftable pawl freewheel 64 is arranged between the rotary drive section 20 and the support section 22, by means of which the rotary drive section 20 and the support section 22 can be optionally brought into rotary drive connection together. The pawl freewheel 64 has an outer race 66 and an inner race 68, wherein the outer race 66 surrounds the inner race 68 in the radial direction 8 on the outside. Pivotable pawls 70, 72 are arranged in the radial direction 8, 10 between the outer and inner races 66, 68. The pawls 70, 72 are in rotary drive connection with the outer race 66, wherein the pawls 70, 72 are each pivotable from a release position into a locked position. The pawls 70, 72 can be pivoted about pivot axes 74 extending in the axial direction 4, 6, wherein the pawls 70 are pivotable in the opposite direction to the pawls 72 from the release position to the locked position and vice versa. In addition, the pawls 70, 72 can be or are supported in the radial direction 8, 10 on the sides of the inner and outer races 68, 66 that face one another in the radial direction 8, 10. The pawls 70, 72 are also pretensioned into their locked position via corresponding spring elements 76.

The outer race 66 of the pawl freewheel 64 is formed in one piece with the annular housing part 56 of the gear housing and therefore also in one piece with the rotary drive contour 36, especially since the rotary drive contour 36 is provided on the side of the annular housing part 56 pointing outwards in the radial direction 8. Furthermore, the inner race 68 of the pawl freewheel 64 is formed in one piece with the annular support section 22 to achieve a particularly compact design. In principle, the support section 22 could be or is supported by an additional radial bearing, preferably a plain bearing, in the radial direction 8 on the gear housing, but in the illustrated embodiment the annular support section 22 is supported in the radial direction 8 by the pawl freewheel 64, more precisely on the sides of the outer and inner races 66, 68 facing each other in the radial direction 8, 10, so that in this way a plain bearing is also created and the pawl freewheel 64 has a dual function.

In addition, the pawl freewheel 64, in particular its outer and inner races 66, 68, and the rotary driver contour 36 are arranged nested in the radial direction 8, 10 with the pinion gears 28, 30 in order to achieve the most direct and reliable possible torque transmission between rotary drive section 20 and support section 22. In particular, the pawls 70, 72 are arranged nested with the pinion gears 28, 30 in the radial direction 8, 10. It has proven to be particularly advantageous if—as in FIGS. 1 and 2—the pawl freewheel 64, in particular its races 66, 68 and/or the rotary drive contour 36, is aligned with the pinion axle 26 or is arranged on this pinion axle 26. In the embodiment shown, the pinion axle 26 in the side view according to FIG. 2 forms an axis of symmetry or a central axis for the pawl freewheel 64.

In order to be able to shift the pawl freewheel 64 into different shifting positions, the pawl freewheel 64 is assigned an activating element 78 that can be displaced in the axial direction 4, 6. In principle, the activating element 78 can be arranged directly on the input side 18 of the differential gear 2; in the embodiment according to FIGS. 1 and 2, however, the activating element 78 can be displaced in the axial direction 4, 6 via a support element 80 fixed to the input side 18 and is therefore arranged indirectly on the input side 18.

The activating element 78 has a tubular supporting section 82 which can be or is supported on a tubular support element section 84 of the support element 80 in the radial direction 8, 10 and in the axial direction 4, 6 in a sliding manner. The support element 80 is subsequently fixed to the gear housing, here the housing half 54, and is preferably designed as a sheet metal or shaped sheet metal part, wherein the tubular support element section 84 extends in the axial directions 4, 6. On its side facing away from the pawl freewheel 64, the activating element 78 has a radial section 86 adjoining the supporting section 82 in the axial direction 6, via which the activating element 78 can be gripped and moved in the axial direction 4, 6 by an actuating device. On a further radial section 88 of the activating element 78 adjoining the supporting section 82 in the axial direction 4, activating pins 90 of the activating element 78 protruding in the axial direction 4 are provided, which can interact directly with the pawls 70, 72 of the pawl freewheel 64 in order to convert the pawl 70, 72 into the respective release or locking position. Each pawl 70, 72 is assigned an activating pin 90 in each case.

Thus, the activating element 78 is displaceable in the axial direction 4 between a first axial position shown in FIGS. 1 and 2, a second axial position and a third axial position. In the first axial position, the rotary drive section 20 is rotary drive coupled in a first and second relative direction of rotation to the support section 22 via the pawls 70, 72, wherein the pawls 70, 72 are held in their locking position by the aforementioned spring elements 76. In the second axial position, the rotary drive section 20 is rotary drive coupled to the support section 22 via the pawls 70 or the pawls 72 in the first relative direction of rotation, but not in the second relative direction of rotation. In the third axial position, however, the rotary drive section 20 is rotary drive coupled to the support section 22 via the pawls 70, 72 neither in the first nor in the second relative direction of rotation. If the drive wheel assigned to the rotary drive contour 36 is driven by an electric machine, then it can be seen from the foregoing description that thanks to the first axial position the electric machine can also be operated as a generator which can be driven by the output side 24 of the differential gear 2.

In order to be able to set and hold the various shifting positions of the pawl freewheel 64 in a particularly targeted manner, the activating element 78 is also assigned a latching device 92 for latching the activating element 78 in at least one axial position, preferably in at least two or at least three axial positions, relative to the pawl freewheel 64, wherein the latching device 92 in the illustrated embodiment enables latching in the first, second and third axial position. In the embodiment according to FIGS. 1 and 2, the latching device 92 is arranged in the radial direction 8, 10 between the tubular supporting section 82 of the activating element 78 and the tubular support element section 84 of the support element 80 in order to act between these sections. The latching device 92 has a latching element 94 spring-pretensioned in the radial direction 8 or 10 on the one hand and two or more latching depressions 96 on the other hand, into which the latching element 94 can latch when the respective axial position is reached.

FIGS. 3 and 4 show a second embodiment of the differential gear 2, wherein the differential gear 2 in the second embodiment substantially corresponds to the differential gear according to FIGS. 1 and 2, so that the differences are substantially discussed below, the same reference numerals for the same or similar parts are used and the above description otherwise applies accordingly.

In contrast to the first embodiment, the gear housing in the second embodiment is still formed by the input side 18, but here by the support section 22 of the input side 18. The inner race 68 of the pawl freewheel 64 is formed in one piece with the support section 22 forming the gear housing. The outer race 66, on the contrary, is formed separately from an input gear 98 of rotary drive section 20 on the input side 18, which has the rotary drive contour 36, wherein the input gear 98 of rotary drive section 20 is fixed in a non-rotatable manner to the outer race 66 of the pawl freewheel 64, for example by means of screws. The input gear 98 has an outer section 100 in the radial direction 8, which is tubular here by way of example and on which the rotary drive contour 36 is provided, and an inner section adjoining the outer section 100 in the radial direction 10 in the form of a radial section 102 formed in one piece with the outer section 100. The input gear 98 can be or is supported in the radial direction 10 inwards via a radial bearing 104, which is designed here by way of example as a roller bearing or needle bearing, on the gear housing formed by the support section 22, more precisely on the tubular axial section 38 of the gear housing. In the opposite axial directions 4, 6, too, the input gear 98 is supported directly or indirectly on the gear housing and is thus fixed.

A support element 80 and a latching device 92 are also provided in the second embodiment according to FIGS. 3 and 4, but the latching device 92 together with the latching element 94 and the latching depressions 96 are arranged in the radial direction 8, 10 between the radial section 88 of the activating element 78 and a second tubular support element section 106 lying opposite the tubular support element section 84 in the radial direction 8, 10. In this embodiment, the two tubular support element sections 84 and 106 form a one-piece structural or sheet metal part, wherein the two sections 84 and 106 are connected to one another via a radial section 108.

In the second embodiment according to FIGS. 3 and 4, too, the pawl freewheel 64 is arranged nested—at least partially—in the radial direction 8, 10 with the pinion gears 28, 30, which also applies—at least slightly—to the rotary drive contour 36.

FIG. 5 shows a third embodiment of the differential gear 2, which substantially corresponds to the embodiment according to FIGS. 3 and 4, so that only the differences are discussed below, the same reference numerals are used for the same or similar parts and the above description otherwise applies accordingly.

In contrast to the second embodiment according to FIGS. 3 and 4, the rotary drive contour 36 is formed in one piece with the outer race 66 of the pawl freewheel 64, as a result of which a greater axial overlap of the rotary drive contour 36 with the pinion gears 28, 30 in the sense of a radial nesting can be achieved. The aforementioned radial section 102, however, has been subsequently fixed to the outer race 66 of the pawl freewheel 64, for example by welding. Otherwise, the radial section 102 is in a manner in the radial and axial directions 8, 10; 4, 6 is supported on the gear housing, which corresponds to the support shown in FIGS. 3 and 4.

FIG. 6 shows a fourth embodiment of the differential gear 2 in at least a partial representation, wherein the differential gear 2 in the fourth embodiment substantially corresponds to the differential gears 2 from the preceding embodiments, so that only the differences are discussed below, the same reference numerals are used for the same or similar parts and the above description otherwise applies accordingly. The pinion gears 28, 30, the shaft 62 and the axle gears 32, 34 have only been omitted for reasons of clarity.

In the fourth embodiment, the rotary drive contour 36 of the rotary drive section 20 is designed as an inner rotary drive contour 36 in the radial direction 10, thus for example as an internal toothing. In the fourth embodiment, the rotary drive contour 36 is also formed in one piece with the inner race 68 of the pawl freewheel 64. The inner rotary drive contour 36 pointing inwards in the radial direction 10 is in rotary drive engagement with a tubular drive wheel 110 which is arranged coaxially to the input and output side 18, 24 and which can preferably be driven by an electric machine. The tubular drive wheel 110 is supported and mounted via a radial bearing 112 on the gear housing, more precisely on the tubular axial section 38 of the gear housing. The radial bearing 112 is arranged nested in the radial direction 8, 10 with the rotary drive contour 36.

It can also be seen from FIG. 6 that the supporting section 82 of the activating element 78 is not arranged on an additional support element, but rather directly on the input side, here the support section 22 of the input side 18, so as to be displaceable in the axial direction 4, 6. For this purpose, the supporting section 82 of the activating element 78 is supported on an outer side 114 running around in the circumferential direction 12, 14. In the radial direction 8, 10 between this circumferential outer side 114 and the supporting section 82 of the activating element 78, the latching device 92 with the components described above, namely the latching element 94 and latching depressions 96, is arranged. In the advantageous embodiment according to FIG. 6, the circumferential outer side 114 is formed on the side of a flange-like radial section 116 of the gear housing formed by the support section 22 that points outwards in the radial direction 8.

FIG. 7 shows the schematic representation of a drive train 118 for a motor vehicle, in particular a hybrid vehicle, wherein the drive train 118 is suitable for all-wheel drive or four-wheel drive. Thus, the drive train 118 has a first wheel axle 120 which is substantially defined by two axle shafts 122, 124 which are connected at their ends to wheels 126 of the motor vehicle. The first wheel axle 120 can be driven by a first drive unit 128, wherein the first drive unit 128 can be an internal combustion engine and/or an electric drive unit, preferably an electric machine. A hybrid drive unit as a combination of an electric machine and an internal combustion engine is particularly preferred here.

In addition, the drive train 118 has a second wheel axle 130, wherein the second wheel axle 130 is substantially defined by a first axle shaft 132 and a second axle shaft 134, at the outer ends of which wheels 126 of the motor vehicle or of the drive train 118 are in turn arranged. A differential gear 2 of the type according to the invention is arranged between the first and second axle shafts 132, 134, wherein the first axle shaft 132 protrudes through the first shaft opening 48 into the gear housing in order to be connected to the first axle wheel 32 in a non-rotatable manner. In the opposite axial direction 4, the second axle shaft 134 protrudes into the second shaft opening 50 of the gear housing in order to be connected to the second axle wheel 34 in a non-rotatable manner. The second wheel axle 130 or its axle shafts 132, 134 can be optionally driven by a second drive unit 136 via the differential gear 2, wherein the second drive unit 136 is preferably an electric drive unit, particularly preferably an electric machine, wherein an electrical machine can then also be operated advantageously as a generator. In order to ensure this drive of the second wheel axle 130, the rotary drive contour 36 of the rotary drive section 20 is in rotary drive connection with a drive wheel of the second drive unit 136, while the first and second axle wheel 32, 34—as already explained above—are in rotary driving connection with the first and second axle shaft 132, 134 of the second wheel axle 130.

LIST OF REFERENCE NUMERALS

2 differential gear
4*l* axial direction
6 axial direction
8 radial direction
10 radial direction
12 circumferential direction
14 circumferential direction
16 axis of rotation
18 input side
20 rotary drive section
22 support section
24 output side
26 pinion axle
28 pinion gear
30 pinion gear
32 first axle wheel
34 second axle wheel
36 rotary drive contour
38 tubular axial section
40 axial section
42 tubular axial section
44 axial bearing
46 axial bearing
48 first shaft opening
50 second shaft opening
52 housing half
54 housing half
56 annular housing part
58 screw connections
60 annular disks
62 shaft
64 pawl freewheel
66 outer race
68 inner race
70 pawl
72 pawl
74 pivot axis
76 spring elements
78 activating element
80 support element
82 supporting section
84 tubular support element section
86 radial section
88 radial section
90 activating pin
92 latching device
94 latching element
96 latching depressions
98 input gear
100 outer section
102 radial section
104 radial bearing
106 second tubular support element section
108 radial section
110 drive wheel
112 radial bearing
114 circumferential outer side
116 radial section
118 drive train
120 first wheel axle
122 axle shaft
124 axle shaft
126 wheels
128 first drive unit
130 second wheel axle
132 first axle shaft
134 second axle shaft
136 second drive unit

What is claimed is:

1. A differential gear with an input side that can be rotated about an axis of rotation, which has a rotary drive contour for the rotary drive engagement with a drive wheel and at least one pinion gear that can be rotated about a pinion axle, and an output side that can be rotated about the axis of rotation, which has a first axle wheel and a second axle wheel which are in rotary drive engagement with the at least one pinion gear, wherein the input side has a rotary drive section on which the rotary drive contour is provided, and a support section on which the at least one pinion gear is arranged, wherein the rotary drive section and the support section can optionally be brought into a rotary drive connection with one another by means of a shiftable pawl freewheel, wherein the pawl freewheel has an outer race, an inner race and in the radial direction between the inner and outer races pivotably arranged pawls, wherein an activating element which can be displaced in the axial direction is provided for shifting the pawl freewheel, and wherein the activating element is arranged on the input side, via a support element fixed to the input side, so that it is displaceable in the axial direction, the activating element having a tubular supporting section which can be or is slidably supported on a tubular support element section of the support element.

2. The differential gear according to claim 1, wherein the pawls can be or are supported in the radial direction on the inner and outer race.

3. The differential gear according to claim 2, wherein the pawls are pivotable about a pivot axis extending in the axial direction.

4. The differential gear according to claim 2, wherein the pawl freewheel or at least one pawl of the pawl freewheel, and/or the rotary drive contour is arranged nested in the radial direction with the at least one pinion gear aligned with the pinion axle.

5. The differential gear according to claim 1, wherein the input side forms a gear housing in which the first and second axle wheel are arranged and/or on which the first and second axle wheel in the axial and/or radial direction can be or are supported.

6. The differential gear according to claim 5, wherein the rotary drive section forms the gear housing in which the support section is accommodated, which is annular and can be moved in the radial direction, by means of a plain bearing or via the pawl freewheel, and/or can be or is supported in the axial direction, with play, on the gear housing.

7. The differential gear according to claim 6, wherein the inner race of the pawl freewheel is in one piece with the annular support section and/or the outer race of the pawl freewheel is now abandoned formed in one piece with the rotary drive contour and/or the gear housing.

8. The differential gear according to claim 5, wherein the support section forms the gear housing, wherein the inner race is formed in one piece with the gear housing and/or the outer race is formed in one piece with the rotary drive contour or is formed separately from an input gear which has the rotary drive contour and which is fixed in a non-rotatable manner to the outer race.

9. The differential gear according to claim 8, wherein the outer race or the input gear is arranged in the radial direction, by means of a roller or needle bearing, and/or can be or is supported on the gear housing in the axial direction, via a radial section on the outer race or the input gear and/or on the tubular axial section of the gear housing.

10. The differential gear according to claim 5, wherein the input side forms a gear housing in which the first and second axle wheel are arranged and/or on which the first and second axle wheel in the axial and/or radial direction can be or are supported by means of a plain bearing.

11. The differential gear according to claim 5, wherein the gear housing has two shaft openings for axle shafts assigned to the first and second axle wheels and at least one of the shaft openings is formed in a tubular axial section of the gear housing, which has a smaller radial extent than an axial section accommodating the pinion gear of the gear housing.

12. The differential gear according to claim 1, wherein the rotary drive contour is formed as an outer rotary drive contour in the radial direction or as an inner rotary drive contour in the radial direction.

13. The differential gear according to claim 12, wherein the inner rotary drive contour is in rotary drive engagement with a tubular drive wheel arranged coaxially to the axis of rotation, which is rotatably mounted on the gear housing, on the tubular axial section of the gear housing.

14. The differential gear according to claim 1, wherein the activating element is assigned a locking device for locking the activating element in at least two or at least three axial positions, relative to the pawl freewheel.

15. The differential gear according to claim 14, wherein the latching device is arranged between the tubular supporting section and the circumferential outer side of the input side, between the tubular supporting section and the tubular support element section or between the activating element and a second tubular support element section of the support element lying opposite the tubular support element section in the radial direction and has at least one spring-loaded latching element on the one hand, which can be latched into two or more latching depressions on the other hand.

16. The differential gear according to claim 1, wherein the activating element interacts with the pawls of the pawl freewheel, wherein the activating element is movable between a first axial position, in which the rotary drive section is rotary drive coupled in a first and second relative direction of rotation to the support section via the pawls, a second axial position, in which the rotary drive section is rotary drive coupled to the support section in the first relative direction of rotation, but not in the second relative direction of rotation, via at least one pawl, and a third axial position, in which the rotary drive section is rotary drive coupled neither in the first nor in the second relative direction of rotation with the support section via the pawls.

17. The differential gear according to claim 16, wherein the activating element interacts with the pawls of the pawl freewheel via axially protruding activating pins on the activating element.

18. A drive train for a motor vehicle with a first wheel axle which can be driven by a first drive unit and a second wheel axle, wherein the second wheel axle can be optionally driven via a differential gear according to claim 1 by a second drive unit.

19. The differential gear according to claim 18, wherein the first drive unit is an electric drive unit, an electric machine and/or an internal combustion engine; and wherein the second drive unit is an electric drive unit; and wherein the input side, or the rotary drive contour of the rotary drive section, is in rotary drive connection with the second drive unit, and the output side is in rotary drive connection with the second wheel axle.

20. The differential gear according to claim 19, wherein the input side, or the rotary drive contour of the rotary drive section, is in rotary drive connection with a drive wheel of the second drive unit, and wherein the first and second axle wheel of the output side is in rotatory drive connection with a first and second axle shaft of the second wheel axle.

* * * * *